Figure 1:
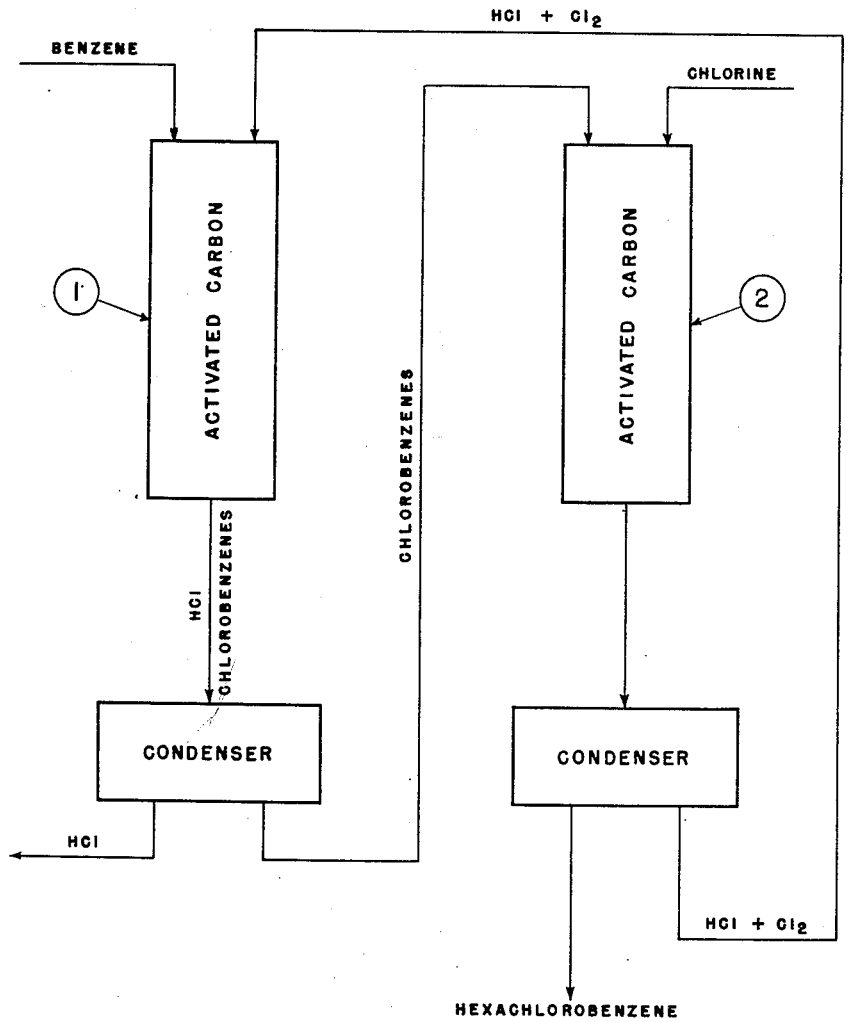

Jan. 22, 1957  G. McCOY ET AL  2,778,860
PREPARATION OF HEXACHLOROBENZENE
Filed Jan. 31, 1952  2 Sheets-Sheet 1

George McCoy + Charles E. Inman
INVENTOR.s
BY
Harold L. Warner.

George McCoy + Charles E. Inman
INVENTOR.'s

United States Patent Office 2,778,860
Patented Jan. 22, 1957

2,778,860

PREPARATION OF HEXACHLOROBENZENE

George McCoy, Philadelphia, and Charles E. Inman, Roslyn, Pa., assignors to The Pennsylvania Salt Manufacturing Company, Philadelphia, Pa., a corporation of Pennsylvania Application January 31, 1952, Serial No. 269,322

8 Claims. (Cl. 260—650)

This invention relates to improvements in the chlorination of aromatic compounds and more particularly to the production of hexachlorobenzene by the direct chlorination of lower chlorinated benzenes or benzene.

The present commercial process for the production of hexachlorobenzene consists in a batch reaction wherein benzene, in the presence of an iron catalyst, is chlorinated directly to produce the hexachlorobenzene. The reaction is generally carried out in an iron reactor into which the benzene is introduced, the chlorine then being passed through the benzene while agitating the reaction mixture. This method of preparing hexachlorobenzene is unsatisfactory, however, because of the time required for chlorination. For example, by this method two to three days would be required to produce a 100 to 500 gallon batch of a good grade hexachlorobenzene. A further objection to this process is that the hexachlorobenzene is invariably contaminated with iron and other catalysts which may be used which must be removed before the hexachlorobenzene can be used for such purposes as the production of pentachlorophenol, which is one of the primary uses of this compound. This removal of the contaminating iron and iron compounds requires special handling and obviously adds to the cost of the final product. Also, sublimation during the chlorination adds to the difficulties of the process.

We have now discovered that a high quality hexachlorobenzene can be prepared directly from benzene on a commercial scale in a relatively short time. Since the chlorination reaction, when using activated carbon as a catalyst, is exceedingly rapid, the time required for chlorination of any given amount by the process of the present invention is dependent primarily on the time required to bring the material in contact with the activated carbon. Thus, by proper equipment design 100 to 500 gallons of benzene could be chlorinated to hexachlorobenzene by using activated carbon as a catalyst in a few hours. On passage of small quantities of benzene together with chlorine through a column packed with activated carbon in the laboratory, the reaction was found to occur almost instantaneously.

It is not necessary to use benzene as the raw material since any of the chlorobenzenes other than hexachlorobenzene may be used. This is of particular advantage when it is considered that the trichlorobenzene, prepared in accordance with our copending application Serial No. 269,323 from benzene hexachloride, can be used directly for the production of hexachlorobenzene. Also, the hexachlorobenzene can be prepared directly from benzene hexachloride or the higher chlorinated cyclohexane compounds through simultaneous dehydrochlorination and chlorination in the presence of an activated carbon catalyst.

The hexachlorobenzene product resulting from the chlorination of benzene or chlorinated benzene compounds, in accordance with our present invention, is of a high degree of purity and requires no further purification to place it in the form of a saleable product. When the time necessary for the preparation of hexachlorobenzene by the prior art method is compared with the exceedingly short reaction periods required when preparing hexachlorobenzene in accordance with our present invention, together with a comparison of the purity of the resulting products, the advantages of our present invention are immediately apparent.

The chlorination of benzene or chlorobenzenes to hexachlorobenzene in the presence of activated carbon can be carried out at temperatures well below the setting point of hexachlorobenzene by inclusion of a solvent, chlorination at temperatures as low as 160° C. being possible. However, since hexachlorobenzene sublimes at a temperature of about 230° C., it is preferred to carry out the chlorination reaction at temperatures somewhat in excess of 230° C. so that the hexachlorobenzene can be removed from the chlorination chamber in the form of a vapor. Temperatures considerably higher than 230° C. can be employed, the only limit with respect to temperature being that the temperature should be kept below the decomposition temperature of the hexachlorobenzene. The hexachlorobenzene after removal is easily separated from the HCl and chlorine leaving the reaction chamber by cooling the mixture of gases to below the solidifying point of the hexachlorobenzene. The hexachlorobenzene product thus obtained is of a high quality, generally having a setting point of 227 to 229° C.

In practicing our invention, we prefer to use two reaction chambers each containing activated carbon, complete chlorination occurring in one while partial chlorination occurs in the other. Reference is made to Figure 1 of the drawing which is a schematic illustration of one method of preparing hexachlorobenzene in accordance with our invention. Initially, benzene with a minor amount of chlorine is fed into a reactor 1 packed with activated carbon and preferably maintained at a temperature of at least 160° C. The chlorine fed to this reactor is preferably insufficient to completely chlorinate the benzene; the resulting products are therefore a mixture of chlorobenzenes and HCl. The chlorobenzene products formed in reactor 1 are fed to reactor 2, similar to reactor 1, together with chlorine in an amount somewhat in excess to that required to complete the chlorination of the material from reactor 1 to hexachlorobenzene. The chlorination products, which comprise hexachlorobenzene, HCl and some unreacted chlorine, leaving reactor 2 are cooled to condense out the hexachlorobenzene which is removed. The remaining HCl and chlorine are then passed into reactor 1 where the chlorine reacts with fresh charges of benzene. The HCl leaving reactor 1 is of sufficiently high purity to be used or sold as a good grade muriatic acid after treatment to remove any entrained organic vapors.

The following examples further illustrate the preparation of hexachlorobenzene through the chlorination of benzene and chlorobenzenes in accordance with our invention. It is understood that the examples are given by way of illustration only and should not be interpreted as limiting the invention.

*Example 1*

A three foot column three-fourth inch in diameter was packed with Columbia Activated Carbon pellets of SXW grade. This column, which served as the reactor column, was then heated to approximately 250° C. Benzene along with an excess of chlorine was then added at the top of the vertical reaction column which was maintained at the 250° C. temperature throughout the reaction. Hexachlorobenzene sublimed from the lower end of the column and was collected in a sublimation chamber; the melting point of the hexachlorobenzene product was 227–229° C. indicating a high quality.

Example 2

Trichlorobenzene along with an excess of chlorine was passed through a reaction column similar to that described in Example 1. The reaction zone was maintained at a temperature of 300° C. throughout the reaction. The product subliming from the lower end of the reaction column was hexachlorobenzene having a melting range of 227–229° C.

The dehydrohalogenation process described in application Serial No. 269,323 and the chlorination described in the present application can be carried out simultaneously without losing the catalytic effect of the activated carbon in either type of reaction. This is of particular value in the production of hexachlorobenzene and chlorobenzenes of chlorine content greater than trichlorobenzene directly from benzene hexachloride, the final product depending on the extent to which chlorination is carried.

By dehydrochlorinating the benzene hexachloride while simultaneously chlorinating the resulting chlorobenzenes with an excess of chlorine in the presence of activated carbon, we have been able to convert substantially all of the benzene hexachloride to hexachlorobenzene.

The raw material, benzene hexachloride, is at present available in large quantities as a by-product in the preparation of the gamma isomer of benzene hexachloride for insecticidal use. Our process therefore serves at least two practical purposes in that it utilizes a heretofore waste material and at the same time provides an improved process for the manufacture of hexachlorobenzene, through which process a substantially pure hexachlorobenzene is obtained. In practicing this phase of our invention, we prefer to heat the benzene hexachloride in the presence of activated carbon to a temperature of at least 230° C. while passing chlorine, in excess to the stoichiometric amount required, through the benzene hexachloride. Temperatures below 230° C. can be used if the reaction is carried out in a suitable solvent so as to enable removal of the hexachlorobenzene product. However, it is easier to obtain the product in the form of a vapor since it can then easily be separated in a substantially pure form. For this, temperatures of at least 230° C. are necessary.

In any large scale commercial production of hexachlorobenzene from benzene hexachloride, it would generally be preferred to handle the benzene hexachloride in the form of a slurry, so that it could be easily moved to the reaction chambers. It is also of advantage to obtain the hydrogen chloride evolved from the reaction in substantially pure form, i. e., free from unreacted chlorine. We, therefore, prefer to carry out any large scale production of the hexachlorobenzene in the particular manner hereinafter more fully described.

Figure 2:
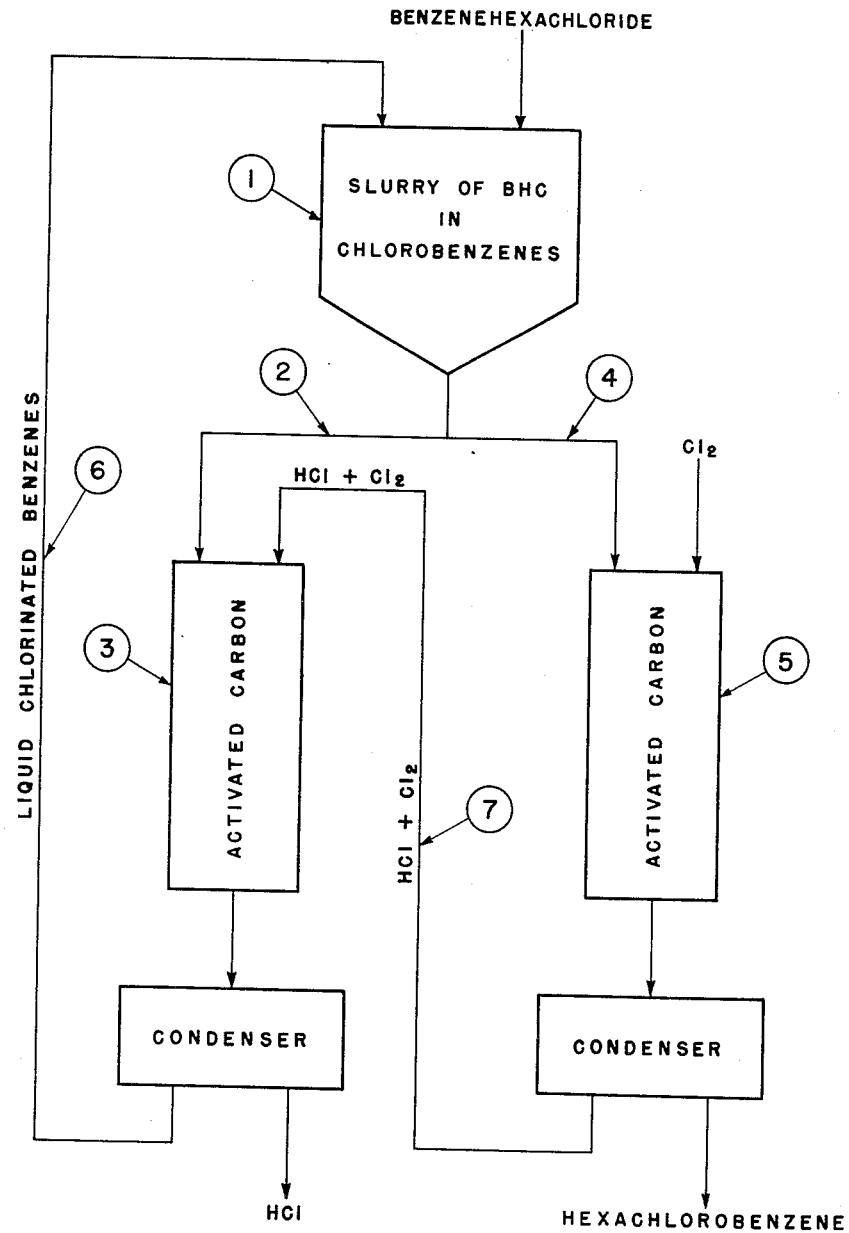

Figure 2 is a schematic flow sheet illustrating the preferred commercial method of preparing hexachlorobenzene in accordance with our invention and schematically illustrating apparatus suitable for its production. Referring to Figure 2 of the drawings, feed chamber 1 is first filled with a slurry of benzene hexachloride in trichlorobenzene. A portion of this slurry is then fed through conduit 2 into reaction chamber 3 while another portion is fed through conduit 4 into reaction chamber 5. Both reaction chambers 3 and 5 are packed with activated carbon, reaction chamber 3 being preferably maintained at a temperature of at least 190° C., whereas the temperature of reaction chamber 5 is preferably at least 230° C. We generally prefer that the temperatures in these reaction chambers not exceed appreciably over 300° C. for chamber 3 and 500° C. for chamber 5. The benzene hexachloride entering reaction chamber 3 is converted to trichlorobenzene and HCl through dehydrochlorination of the benzene hexachloride. The trichlorobenzene formed is returned to the feed chamber through conduit 6 where it is slurried with additional benzene hexachloride through the use of suitable agitators not shown. The resulting slurry is then passed to reaction chambers 3 and 5. The HCl leaving reaction chamber 3 is preferably absorbed in water and thereafter used or sold as muriatic acid.

Chlorine is admitted into reactor 5 together with the slurried benzene hexachloride. The amount of chlorine used is somewhat in excess of the stoichiometric amount necessary to produce hexachlorobenzene. The product leaving reactor 5, resulting from the simultaneous dehydrochlorination and chlorination occurring therein, consists primarily of hexachlorobenzene and a mixture of gases consisting essentially of HCl and chlorine. After condensing out the hexachlorobenzene, the remaining HCl and chlorine are passed through conduit 7 to reactor 3 where the chlorine reacts with some of the trichlorobenzene, the resulting chlorobenzenes together with any unreacted trichlorobenzene being returned to feed chamber 1.

The following example, given for purposes of illustration only, will help to better illustrate the preparation of chlorobenzenes from benzene hexachloride in accordance with our present invention. As will be seen from the example, the product obtained is of a high degree of purity as compared to hexachlorobenzenes generally available on the market which have melting points of around 125° C.

Example 3

Alpha-beta benzene hexachloride isomers were fed together with an excess of chlorine into the top of a reaction column similar to that described in Example 1. The reaction column throughout the process was maintained at a temperature of 350° C. From 800 grams of the alpha and beta benzene hexachloride reacted, 466 grams of hexachlorobenzene having a melting point of 227–229° C. was obtained. This was 95.4% of the theoretical yield.

Having thus described our invention, we claim:

1. The method of preparing hexachlorobenzene comprising heating material of the group comprising benzene and chlorobenzenes of less than 6 atoms of combined chlorine in the presence of activated carbon at a temperature of 230 to 500° C. together with an excess of chlorine to the stoichiometric quantity necessary to convert the materials of said group to hexachlorobenzene.

2. In the preparation of hexachlorobenzene, the process comprising partially chlorinating benzene in a first reactor in the presence of activated carbon at a temperature of 160 to 300° C. to form a mixture of lower chlorinated benzene compounds, passing said mixture to a second reactor containing activated carbon, chlorinating said mixture in said second reactor at a temperature of 230 to 500° C. with an excess of chlorine to the stoichiometric amount necessary to convert said mixture to hexachlorobenzene and HCl, removing the reaction product of said second reactor which consists primarily of a mixture of hexachlorobenzene, HCl and unreacted chlorine, cooling said mixture to below 230° C. to condense out said hexachlorobenzene, passing the remaining HCl and chlorine into said first reactor, together with fresh charges of benzene, and removing HCl from said first reactor.

3. The method of preparing hexachlorobenzene comprising heating benzene hexachloride to a temperature of at least 190° C. in the presence of chlorine and an activated carbon, the chlorine being present in an amount not less than 1.5 mols chlorine per mol benzene hexachloride.

4. The method of preparing hexachlorobenzene comprising heating benzene hexachloride to a temperature of at least 230° C. in the presence of activated carbon while passing chlorine through the reaction mixture in an amount such that all of the chlorine is not reacted.

5. The process for making hexachlorobenzene from benzene hexachloride comprising contacting benzene hexachloride with an activated carbon at a temperature of 230 to 500° C. to decompose said benzene hexachloride while exhaustively chlorinating the decomposition products.

6. The process of preparing hexachlorobenzene comprising preparing a slurry of benzene hexachloride with a material selected from the group consisting of benzene and chlorobenzenes and heating said slurry to at least 230° C. in the presence of an activated carbon while chlorinating said slurry with an excess of chlorine over the stoichiometric amount necessary for preparing hexachlorine benzene.

7. The process of making hexachlorobenzene comprising preparing a slurry of benzene hexachloride and material selected from the group consisting of benzene and chlorobenzenes, passing a portion of said slurry into a first reactor containing activated carbon while maintaining said first reactor at a temperature of not less than 190° C. to decompose the benzene hexachloride into trichlorobenzene and HCl, passing a second portion of said fluid mixture, together with chlorine in excess to the stoichiometric amount necessary to convert said slurry to hexachlorobenzene, into a second reactor containing activated carbon while maintaining said second reactor at a temperature of not less than 230° C. to form hexachlorobenzene, cooling the exit vapors which consist essentially of hexachlorobenzene, HCl and chlorine from said second reactor to condense out said hexachlorobenzene and passing the HCl formed therein together with the unreacted chlorine into said first reactor together with fresh charges of benzene hexachloride.

8. A continuous process for making hexachlorobenzene comprising preparing a slurry of benzene hexachloride in a material selected from the group consisting of benzene and chlorobenzenes, passing a portion of said slurry into a first reactor containing an activated carbon catalyst while maintaining said first reactor at a temperture of 190 to 300° C. to decompose the benzene hexachloride into trichlorobenzene and HCl, passing a portion of said slurry, together with chlorine in excess to the stoichiometric amount necessary to convert said slurry to hexachlorobenzene, into a second reactor containing an activated carbon catalyst while maintaining the temperature of said second reactor between 230 and 500° C. to form hexachlorobenzene and HCl, cooling the exit vapors from said second reactor, which consists essentially of hexachlorobenzene, HCl and unreacted chlorine, to condense out said hexachlorobenzene, passing the HCl and unreacted chlorine from said second reactor into said first reactor, the chlorine being used to partially chlorinate some of the trichlorobenzene formed therein, removing the HCl passed into said first reactor with the HCl formed therein and slurrying the chlorobenzene products of said first reactor with fresh amounts of benzene hexachloride to form additional slurried benzene hexachloride for feeding to both said first and second reactors as described.

References Cited in the file of this patent

UNITED STATES PATENTS

| | | |
|---|---|---|
| 2,123,857 | Wibaut et al. | July 12, 1938 |
| 2,473,990 | Darragh | Jan. 21, 1949 |
| 2,724,002 | Viriot | Nov. 15, 1955 |

FOREIGN PATENTS

| | | |
|---|---|---|
| 492,862 | France | Apr. 5, 1919 |
| 955,816 | France | July 4, 1949 |
| 503,063 | Belgium | Nov. 5, 1951 |